Figure 1:
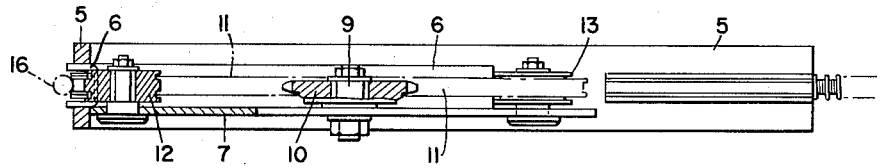

Dec. 11, 1951  S. PILE  2,578,592
CORNER GUIDE FOR ENDLESS CONVEYER CABLES
Filed Aug. 29, 1947  2 SHEETS—SHEET 1

INVENTOR
SYDNEY PILE

BY *Singer, Ehlert, Stern & Carlberg*
ATTORNEYS

Dec. 11, 1951 S. PILE 2,578,592
CORNER GUIDE FOR ENDLESS CONVEYER CABLES
Filed Aug. 29, 1947 2 SHEETS—SHEET 2

INVENTOR
SYDNEY PILE
ATTORNEYS

Patented Dec. 11, 1951

2,578,592

UNITED STATES PATENT OFFICE 2,578,592

CORNER GUIDE FOR ENDLESS CONVEYER CABLES

Sydney Pile, London, England, assignor to Teleflex Products Limited, London, England, a British company Application August 29, 1947, Serial No. 771,268
In Great Britain August 31, 1946

2 Claims. (Cl. 198—137)

This invention relates to conveyors which comprise an endless travelling member formed by a multi-stranded wire cable, whose driven movements give the necessary travel to conveyed devices and which in its course by suitable guiding means passes around corners, and has for its object to provide efficient and light-weight guiding means whereby the change of direction at corners is effected in an extremely simple and advantageous manner.

In normal known constructions, such endless travelling members, at corners, pass around freely mounted guide wheels or, at re-entrant or other corners, are guided by suitably bent and constructed containing units. However, it also has been proposed to provide supporting means for travelling cables and the like comprising a quadrant-like or curved bearing member to support part of the run of an endless chain with which the cable engages, the said chain passing around guide wheels carried by side plates which project on each side of the chain. In some cases with this construction an endless roller chain is interposed between the endless chain and the bearing member, to travel with the endless chain and cable.

According to the present invention, corner guiding means, in a conveyor system of the type to which the invention relates, comprise a suitably carried and guided endless roller chain having part of its run guided at the corner by a fixed guiding member of channel section and circumferential or other curved shape (according to the exact nature of the corner to be turned) in such manner that the outer surface of the said roller chain forms the bearing surface for the endless travelling member, that is, the cable, of the conveyor as it moves around the corner, while the chain is supported by the base of the channel and guided by the sides thereof.

In action, the driving "adhesion" or grip of the endless travelling member of the conveyor on the chain causes the latter to be moved therewith, thus to minimise the total frictional or other effort of the parts through the position which gives the change of direction.

The invention is particularly but not exclusively concerned with structures in accordance with the specification of United States Patent No. 2,404,885 applied for by the present applicant, which comprises a flexible multi-stranded metal wire cable with helical projections on its outer surface, which functions as the endless travelling member of the conveyor, and the invention is concerned to improve the structure therein described in replacement of corner wheel assemblies or other guiding means for change of direction.

In addition to the above, in some cases the mounting of the endless chain may be such that from a preliminary set position it is then moved to its operating position and by such movement imparts or assists in imparting the essential stretching or tension to the endless travelling member or cable of the conveyor.

Figure 2:
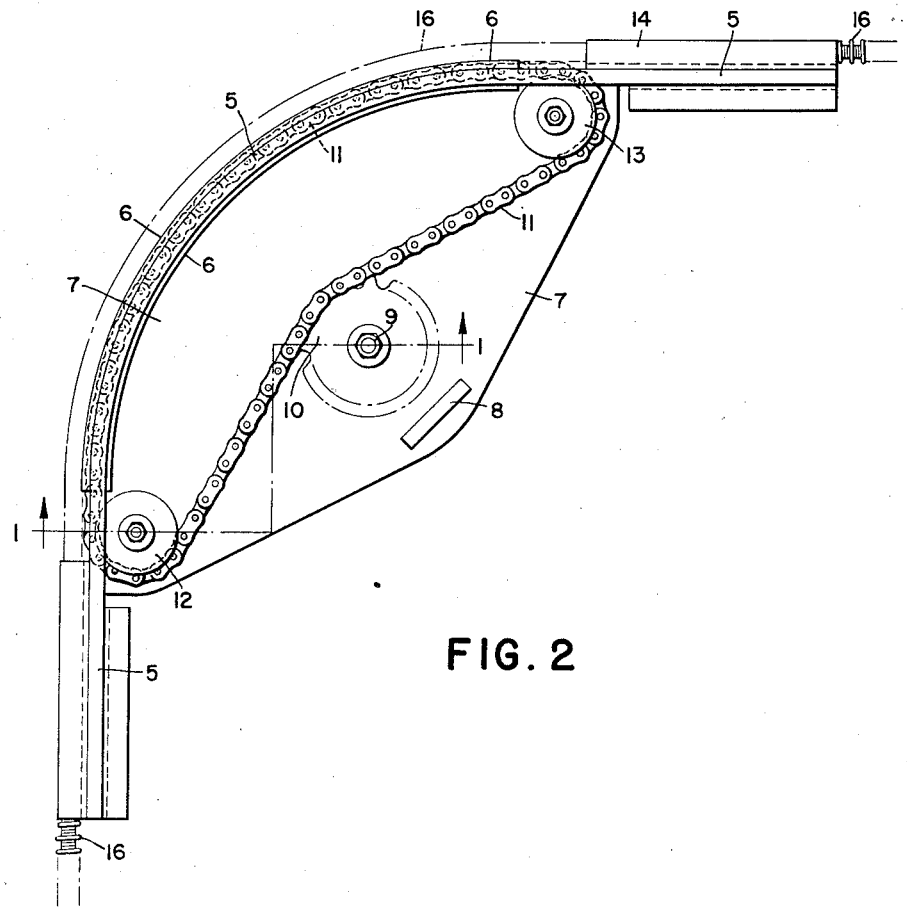
Figure 3:
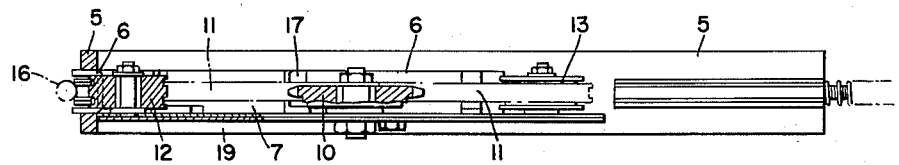
Figure 4:
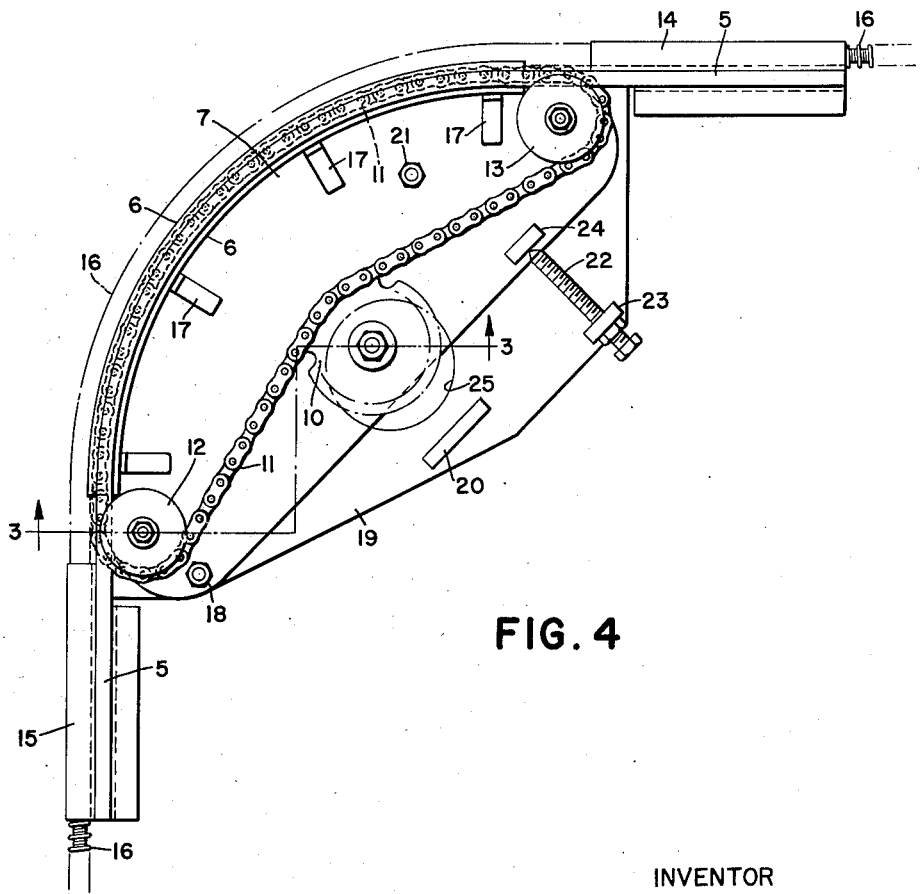

In order that the invention may be better understood, it will now be described with reference to the accompanying drawings, which are given by way of example only and in which:

Fig. 1 is an elevation partly in section on the general line 1—1 (Fig. 2) and Fig. 2 a plan, of one method of carrying the invention into effect, and Fig. 3 is an elevation partly in section on the general line 3—3 (Fig. 4), and Fig. 4 a plan, of another method similar to that shown in Figs. 1 and 2 but including modifications.

In the particular method of carrying the invention into effect as shown in Figs. 1 and 2 and as applied to a conveyor system as described in the specification of the before-mentioned Patent No. 2,404,885, the runway 5 at a corner is bent into a curve, for example a circumferential curve from a centre, and is slotted intermediate its depth, not for the projection of a corner wheel but for the projection of the outer open portion of a correspondingly bent channel member 6 which is welded or otherwise attached to said runway 5 so that its outer open mouth projects therefrom.

The curved runway 5 is welded to and supported by a plate 7 coming in a more or less horizontal plane and adequately carried.

For example, it may be carried from a lug 8, by any suitable suspension system. The plate 7 carries, preferably in an adjustable manner (in so far as the axis is concerned) the spindle 9 of a sprocket wheel the sprocket 10 being adapted to engage a roller chain 11 which passes around two freely mounted guide rollers or wheels 12 and 13 (having their running surfaces machined for the engaged passage of the chain 11) to lead such chain to the channel member 6, all necessary parts being suitably slotted or notched for the purpose.

The slotted conduit portions 14 and 15 (similar to 33 in the specification of the before-mentioned patent) for the cable 16 attached to the runway 5 tangentially lead to the exterior run of the roller chain 11 so that the said driving cable 16 passing from and to these conduits is led and directed, in a tangential manner, to the exterior of the roller surface of the outer part of the chain 11.

Thus it will be understood that by the tensional pull of the drive, the cable 16 with the helically projecting coils (in the example being described) in its change of direction around the corner, is forced into contact and travels in driving contact with that portion of the endless roller chain 11 coming in the contacting position and as shown in Fig. 2.

Obviously, it will be appreciated that as the endless roller chain 11 is mounted freely to move around its guide wheels 12 and 13 and its sprocket wheel such as 10, the pulling effort on the cable 16 around the angular bend causes the chain to travel in its own easy manner.

It is found in practice that such a chain, replacing a guide wheel, gives approximately a 60% decrease in weight for this corner guiding assembly and approximately 20% less friction (as measured by tractive effort) for the same assembly.

To adapt structures in accordance with the invention for a primary set-up whereby the cable, such as 16, is given its initial tension, means may be provided whereby the runway around one or more corners for the cable may first be set in a preliminary position and then moved a desired amount to impart the essential stretching or tension to the cable.

Thus, and as shown in Figs. 3 and 4, for example, the structure is modified so that the plate 7 carries the channel 6 by welded brackets 17. The plate 7 also carries the wheels 12 and 13 and sprocket 10 and is pivotally mounted at 18 (by a bolt and nut assembly) on a main plate 19 having a suspending lug 20; the plate 19 carries by welding the runway 5 with its circumferential slot for the emergence of the channel 6 but in this case the channel is not attached to the runway but, as before explained, to the plate 7 by the brackets 17.

In mounting the parts, as a preliminary set-up, the channel 6 does not project through the slot in the runway 5 but the cable 16 is placed therearound and in contact with the chain 11 and then after the primary stressing (by shortening the cable to an appropriate length) the plate 7 is turned from its preliminary set position on the pivot 18 by operating the screw 22 hereafter referred to, to bring it into a set position as shown in Fig. 4 (where the cable is fully tensioned) in which it is locked by the bolt and nut assembly 21, the bolt passing through aligned apertures in the plates 7 and 19.

In this position it is also maintained by the screw 22 operating through a tapped lug 23 on the lower plate 19 and abutting a lug 24 on the upper plate 7.

Moreover, as will be understood, to bring the parts into position the said screw and lug assembly 22–24 is utilised before the bolt and nut assembly 21 can be brought into position.

In the particular construction shown in Figs. 3 and 4 the heads of the pintles or spindles for the guide wheels 12 and 13 of the endless chain come above the lower plate 19 whilst the main pintle or the like and nut securing means for the sprocket wheel 10 comes in a suitable clearance aperture, slot or the like 25 in the lower plate 19.

Although the invention is particularly suitable for corners in runways of conveyors in accordance with the invention and particularly for such conveyors which are in accordance with the before-mentioned Patent No. 2,404,885, it is not confined thereto but may be adapted, in various appropriate mechanical manners, for reentrant bends, corners or the like the corresponding structures.

Further, although the invention is particularly suitable for conveyors having endless travelling members formed by multi-stranded metal cables with helical projections on the outer surface, yet obviously it is not limited thereto. The endless member of the conveyor may comprise any suitable known constructional unit which this part takes in the conveyor system, for example the invention may be used with smooth forms of cable as in the case of cableways and conveyors having the standard form of helically laid steel or hemp ropes. Thus, in the case of overhead ropeways and so-termed "Blondins" the heavy corner wheel constructions which build up high loads can be replaced by constructions in accordance with the present invention.

The invention is not limited to the precise forms or details of construction herein described, as these may be varied to suit particular requirements.

What I claim and desire to secure by Letters Patent of the United States of America is:

1. A corner guiding means for an endless conveyor cable, comprising a plate, a curved channel member fixed to said plate, an endless roller chain, a sprocket rotatably mounted on said plate, and a plurality of guide wheels rotatably mounted on said plate, said sprocket and said guide wheels coacting with the base of said channel member to tautly support said chain, said chain being guided by the sides of said channel member, the outer surface of said chain forming a bearing surface for said cable throughout the length of said channel member.

2. A corner guiding means for an endless conveyor cable, comprising a channel member curved in a horizontal plane, an endless roller chain, a sprocket, a plurality of guide wheels, and a mounting plate, said channel member being secured to said plate, said sprocket and said guide wheels being rotatably mounted on said plate, said sprocket and said guide wheels coacting with the base of said channel member to tautly support said chain; said chain being guided by the sides of said channel member and forming a bearing surface for said cable.

SYDNEY PILE.

REFERENCES CITED

The following references are of record in the file of this patent:

UNITED STATES PATENTS

| Number | Name | Date |
|---|---|---|
| 1,355,460 | Forbes | Oct. 12, 1920 |
| 1,363,533 | Roe | Dec. 28, 1920 |
| 2,404,885 | Pile | July 30, 1946 |

FOREIGN PATENTS

| Number | Country | Date |
|---|---|---|
| 301,823 | Germany | Nov. 6, 1917 |